No. 671,116.  
Patented Apr. 2, 1901.

E. G. NEIGHBOR.  
CONCENTRATOR.  
(Application filed Aug. 18, 1899.)

(No Model.)  
3 Sheets—Sheet 1.

Witnesses  
Oliver B. Kaiser  
Edwd S. Alexander

Inventor  
Elihu G. Neighbor  
by Wood, Boyd & Wood  
Attorneys

No. 671,116. Patented Apr. 2, 1901.
E. G. NEIGHBOR.
CONCENTRATOR.
(Application filed Aug. 18, 1899.)

(No Model.) 3 Sheets—Sheet 2.

Witnesses
Oliver B. Kaiser
Edwd T. Alexander

Inventor
Elihu G. Neighbor
by Wood Boyd & Wood
Attorneys

THE NORRIS PETERS CO., PHOTO-LITHO., WASHINGTON, D. C.

No. 671,116. Patented Apr. 2, 1901.
E. G. NEIGHBOR.
CONCENTRATOR.
(Application filed Aug. 18, 1899.)
(No Model.) 3 Sheets—Sheet 3.
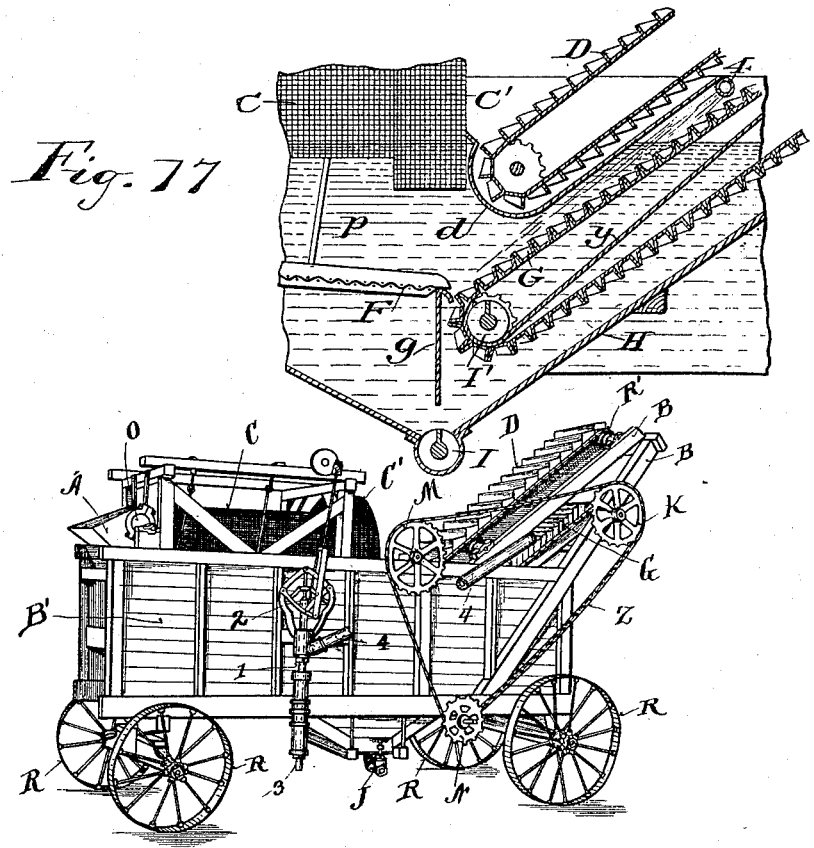
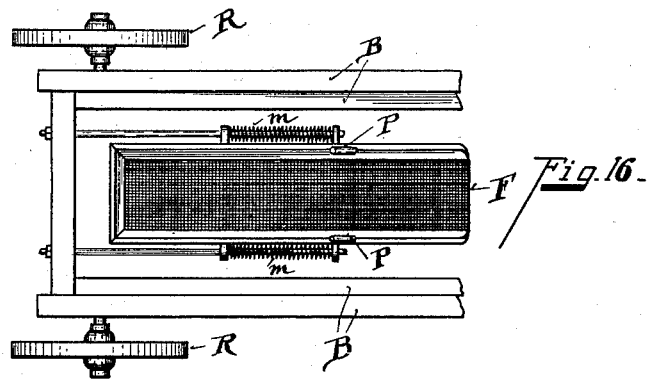
Witnesses
Oliver B. Kaiser
Viola D. Georgi
Inventor
Elihu G. Neighbor
By Wood Boyd & Wood
Attorneys

UNITED STATES PATENT OFFICE.

ELIHU G. NEIGHBOR, OF OGDEN, UTAH.

CONCENTRATOR.

SPECIFICATION forming part of Letters Patent No. 671,116, dated April 2, 1901.

Application filed August 18, 1899. Serial No. 727,722. (No model.)

*To all whom it may concern:*

Be it known that I, ELIHU G. NEIGHBOR, residing in Ogden, county of Weber, State of Utah, have invented a new and useful Machine Called a Concentrator, of which the following is a specification.

This invention relates to a concentrator adapted to separate the precious metal from the earth and gravel in placer-mining.

In placer-mining many of the deposits carry more or less fine or flour gold, which in the ordinary processes of mining floats off with the tailings, especially where a large amount of water is used. Also much of the flour-gold is lost where the water and tailings flow in the same direction.

In my apparatus herein shown and described the tailings are carried off against an inflowing current of water, and the flour-gold is washed out of the tailings and saved. This is the primary object of my invention.

Another object of my invention is to provide a perforated revolving screen-cylinder partially immersed in water, in which the material is first washed. This cylinder has a contracted outlet in center of the discharging end, so as to keep the material from being discharged too rapidly. This washing is more thoroughly accomplished by holding the material within the cylinder, so that the attrition of the particles of the charge under revolving action of the cylinder removes all of the metal, which is forced through the meshes of the cylinder as fast as it is set free.

Another object of my invention is to separate out the metal from the first that is passed through the revolving cylinder. The flour-gold is not easily separated from this finer material. I therefore provide means for carrying the tailings in some proper elevator against the inflowing current of water, thereby effecting a great saving.

The various mechanical features of my invention will be more fully set forth in the description of the accompanying drawings, forming a part of this specification, in which—

Figure 1:
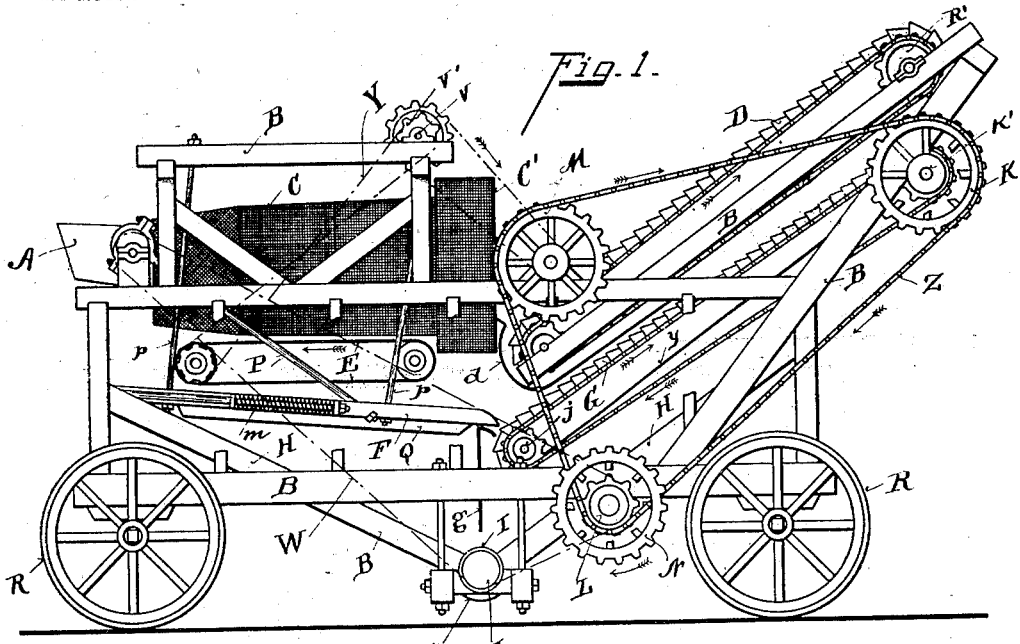
Figure 2:
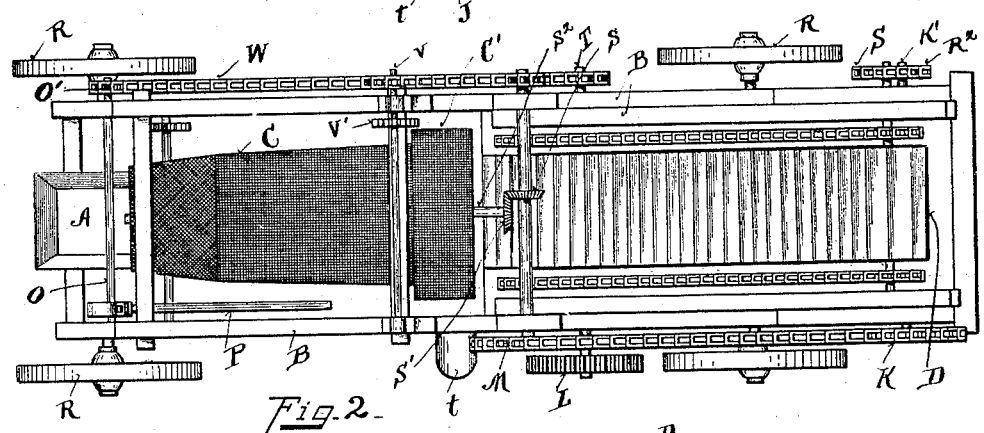
Figure 3:
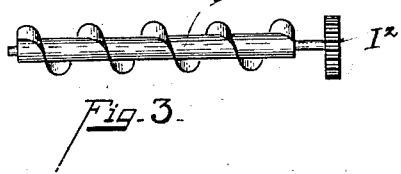
Figure 4:
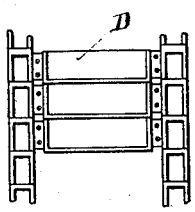
Figure 5:
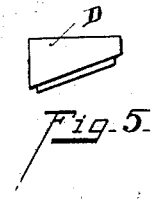
Figure 6:
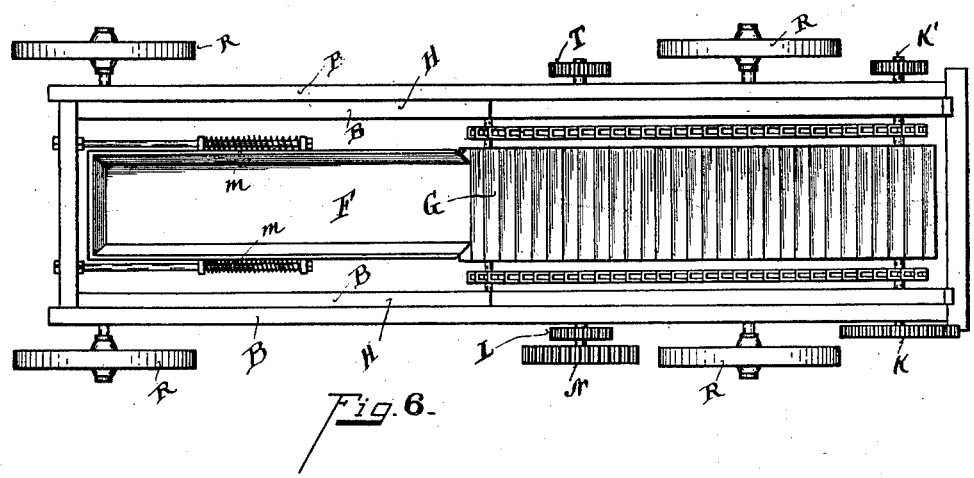
Figure 10:
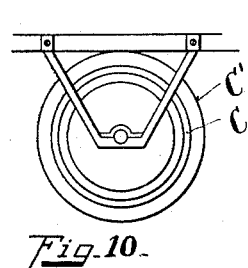
Figure 7:
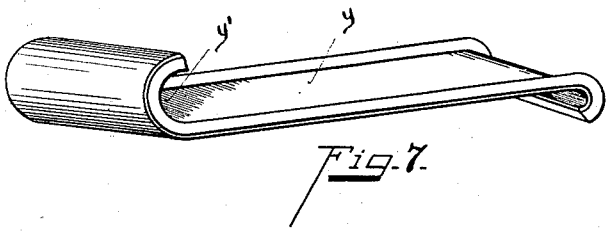
Figure 8:
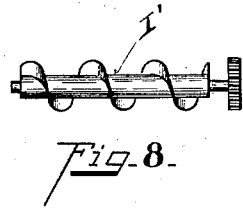
Figure 11:
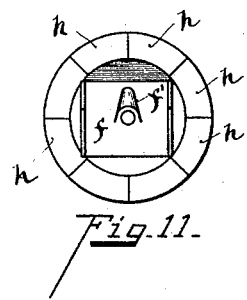
Figure 9:
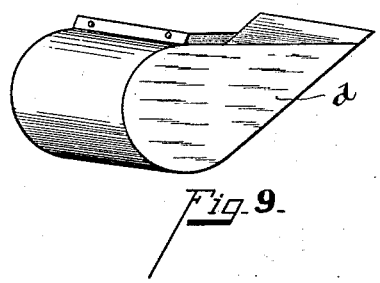
Figure 12:
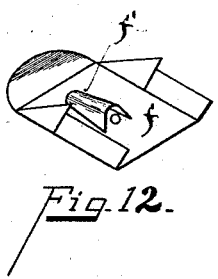
Figure 13:
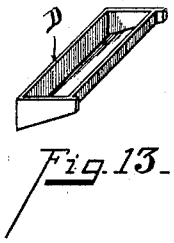
Figure 14:
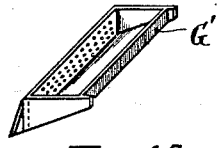

Figure 1 is a side elevation of my improvement with the sides of the water-tank removed from the frame. Fig. 2 is a top plan view of Fig. 1. Fig. 3 is a plan view of a screw conveyer. Fig. 4 is a sectional top plan of the primary elevator. Fig. 5 is an end view of one of the buckets of the primary elevator. Fig. 6 is a top plan view of the secondary elevator and vibrating separator. Fig. 7 is a perspective view of a shelf or conductor hung on the inside of the secondary elevator. Fig. 8 is a perspective view of another screw conveyer and its driving sprocket-wheel. Fig. 9 shows a boot in which the primary elevator works. Fig. 10 is an end view of the hollow revolving screen-cylinder. Fig. 11 is an end elevation of the larger end thereof. Fig. 12 is a perspective view of a spout fitting into the end of the cylinder shown in Fig. 11. Fig. 13 is a perspective view of the buckets of the primary elevator. Fig. 14 is a perspective view of one of the buckets of the secondary elevator. Fig. 15 is a perspective view of my concentrator. Fig. 16 is a plan view of the shaking-screen. Fig. 17 is an illustrative sectional view of my improvement, showing the manner of supplying water to the tank.

B B represent the framework of a water-tight tank, within which the separator is worked.

B' represents the shell of the water-tank attached to the framework B. The frame is mounted upon carrying-wheels R.

C represents a perforated revolving screen-cylinder. This screen-cylinder is revolved by power, as will later be explained.

A represents a hopper for feeding material into the front end of the cylinder C. It will be observed that the lower section of the cylinder C depends below the top of the frame B of the water-tank, which is filled with water, so that the said cylinder is partially immersed in water and subjected to the action of washing when it revolves, which washes out the sand, dirt, and metal, carrying the same through the screen of the cylinder.

C' represents an enlarged portion of the screen-cylinder, which is in the form of an annulus, within the periphery of which annulus is fixed a series of radial partition-plates, dividing the same into compartments. As the cylinder is revolved the stones and gravel are dumped into this annulus, and the plates, acting as buckets, carry the stone and gravel up high enough to dump them onto spout f', which is suspended above the shaft of the cylinder.

In the drawings the washings are shown deposited on a carrier E, which is shown as an endless belt; but this may be omitted, if desired, not materially affecting the operation of my concentrator, but I prefer to embody the same therein.

F represents a vibrating sieve, the floor of which is perforated sheet-steel, preferably with perforations of about three thirty-seconds of an inch. This sieve is hung upon rods $p$, attached to the top of the frame, and is actuated by eccentric-rods P, which work against coil-springs $m$ in the usual manner of operating shaking-screens.

Q represents a spout or bottom attached to the under side of the shaking-sieve for conducting the finer material to the center of the machine, the end terminating over the screw conveyer I.

$g$ represents an apron hung under the end of the sieve for guiding the material into the elevator-conveyer and to prevent the metal from being thrown into the elevator.

In separating the finer metal from its associations in placer-mining the coarser materials, such as boulders and stone and coarse gravel, are thoroughly washed, so that their surfaces are cleaned of dirt and sand which bear the metal. This material is thoroughly cleaned of the adhering dirt and metal by the revolving motion and the attrition of the screen-cylinder. In order to carry off the tailings from the cylinder, I preferably employ a primary elevator-conveyer D, which consists of endless chains carrying buckets working over sprocket-pulleys R'. These buckets are preferably shaped as shown in Fig. 13. In order to prevent the buckets from carrying out water, the lower end of the elevator is immersed or set in a boot $d$, as shown in Fig. 9. The coarse gravel, stone, and boulders are dumped from the screen directly into the buckets of this elevator, from which they are discharged out of the way. The construction of this elevator is not important, as any means may be employed to carry off the coarser tailings; but the elevator is useful, as it makes its own dump.

G represents a secondary elevator, which consists of an endless belt, preferably formed of sprocket-chains, as shown, to which are attached a series of perforated buckets G', which are constructed as shown in Fig. 14. The tailings from the sieve or screen F are deposited into this elevator, as shown in Fig. 1. This elevator works with the lower end in water, which, as the buckets travel up, gravitates down through the perforations, carrying with it the dirt, sand, and metal, if any adheres to the tailings. The entire body of water used in the process of washing is applied or sprayed onto the upper end of this elevator, gravitating through the gravel and perforations, making a final washing and separation. The back of the bucket is A-shaped, the inner portion being perforated. This prevents the metal from passing into next bucket.

$y$ (see Fig. 7) represents a shelf or spout hung between the chains of this elevator, so as to catch the washings and metal and carry them back to deposit the same on wings of the screw conveyer I'. Its lower end is bent into the form of an open cylinder $y'$, in which revolves the screw conveyer I', which is mounted on the shaft $j$, that carries lower end of the screen bucket elevator G, the buckets of which pass outside of said cylindrical end $y$. This conveyer I' catches the metal, dust, and dirt washed out of the buckets of the elevator G and discharges them into the screw conveyer I vertically underneath.

H represents an inclined floor under the separator, which is preferably V or trough shaped and lined with sheet metal, such as galvanized iron, so that the metal substances will be readily washed into the screw conveyer I. This conveyer has a pipe termination, to which is attached a faucet at J to regulate the flow of water discharged out of the concentrator. Under this faucet are suspended burlaps, copper plates, (either or both may be used,) or other means for concentrating or amalgamating the metal, so as to prevent the waste of the same when the water is discharged. An overflow-weir is made at the top of the tank, and the water is conveyed from this weir and discharged upon a catching device under the faucet.

N represents a sprocket-wheel, which is driven by any power device. L represents a transmitting sprocket-wheel keyed to the same shaft.

Z represents a sprocket-chain transmitting power to the sprocket-wheel K, which is keyed upon the upper shaft of the secondary elevator G and drives the same. Said sprocket-chain also passes over the sprocket M, the shaft of which is provided with a bevel-gear $s$, meshing with the bevel-gear $s'$, which is mounted on the shaft $s^2$, upon which is hung the revolving screen-cylinder.

S represents a sprocket-wheel on the shaft K' of the primary elevator D. This receives motion from a similar sprocket-wheel on shaft $R^2$ of the secondary elevator.

The screw conveyer I is operated by endless chain W, receiving power from sprocket-wheel T, placed on the opposite side of the concentrator and on the shaft which carries the sprockets L N, operating sprocket $I^2$ of the screw conveyer, and thence around the sprocket O' on the eccentric-shaft O, as shown by dotted line W', Fig. 1.

The conveyer E is shown as driven by a cross-belt Y, taking its power from the shaft $v$ of pulley $v'$. Any other suitable mechanism may be employed for driving conveyer E in the direction shown by the arrow, so as to dump the screenings on the upper end of the vibrating screen F. As before stated, this conveyer is simply for the purpose of depositing all the screenings from the cylinder C onto the upper end of the vibrating screen that they may pass over the entire surface of the screen, but it is not absolutely essential to the operation of the separator.

In Fig. 15, 1 represents the pump, of any ordinary construction; 2, the pitman for driving the same; 3, the supply-pipe, and 4 the discharge-pipe, of the pump. The discharging end of the pipe is bent around and suspended above the endless-carrier G. It supplies all the water to the water-tank. The proper level is maintained in the tank by regulating the discharge-valve J according to the supply of water by the pump. As shown in Fig. 15, the pump is at one side of the tank and a nozzle is passed around to the rear end of the tank and inserted between the two elevators, (see Fig. 17,) pointing toward the front of the tank. While in this position, it first strikes the tailings on the lower elevator and affords a constant stream of water in opposition to the matter undergoing separation in the revolving cylinder and the conveyer.

I am aware that separators and various forms of screeners for gradual concentration are not broadly new, and I only claim them as embodied in substantially the combination set forth in my claims. The problem of proper concentration, however, is one in which slight differences in construction, in operation, and disposition of parts are oftentimes of the essential importance. There must be several successive screenings. The operations should each be as efficient as is mechanically possible. They must be arranged relatively in the shortest possible time, the smallest possible compass, and each step of the way must have its means for reclaiming any possible portion of the precious metal carried into that step. It is only in this manner that practically all the metal can be saved. My screening, shaking, and tailing operations are all compactly arranged in one tank, one instrumentality overhangs its succeeding one in such a way as to avoid practically all waste, and all the operations are carried on in opposition to a constantly-incoming current of water, the greatest impact being borne by the lower off-carrier at the end of the operation, in which manner the most efficient and complete separation possible is effected.

Having described my invention, I claim—

1. In a separator the combination of a tank, a longitudinally-disposed revoluble screen, means for charging one end, an endless carrier under the main body of said screen adapted to travel toward the receiving end of the cylinder, a shaking screen-table under said carrier inclined toward the discharge end of said cylinder, an endless elevator-carrier for said screen and another for said shaking-table, the lower ends of said carriers being respectively under the discharge ends of said screen and table, said carriers being rearwardly and upwardly inclined out of said tank, means for operating said parts in proper relative movements, a collector under said parts, and means for injecting a current of water into said tank from the discharge end toward and against the product being operated upon by said screen, table and carrier, the greatest impact being borne by the tailings carried off by the carriers, substantially as specified.

2. In a separator the combination of a tank having a trough-shaped bottom, a screw conveyer in said trough, a revoluble screen partly immersed in said tank, means for charging the end of said screen located at the end of said tank, an endless carrier under said screen traveling toward the receiving end, a shaking screen-table under said carrier, inclined toward the rear of the tank, an endless elevator-carrier having its lower end under the shaking-table and upwardly and rearwardly inclined out of said tank, means for operating said parts in time movements, and means for injecting a current of water into said tank from the rear end toward and against the material operated upon by the screen, table and carrier, the greatest impact being against the carrier, the flow of the water being in a direction the reverse to the direction in which the material is discharged, substantially as specified.

ELIHU G. NEIGHBOR.

Witnesses:
A. M. HUNTER,
S. L. IVES.